No. 687,999. Patented Dec. 3, 1901.
H. LIEBREICH.
TELEPHONE RECEIVER.
(Application filed Nov. 30, 1900.)
(No Model.)
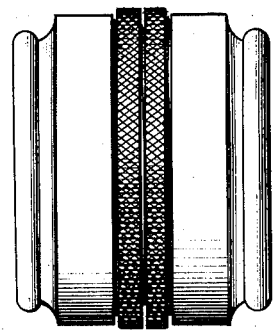
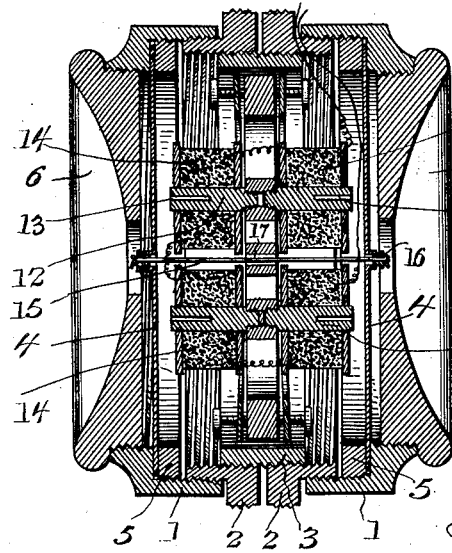
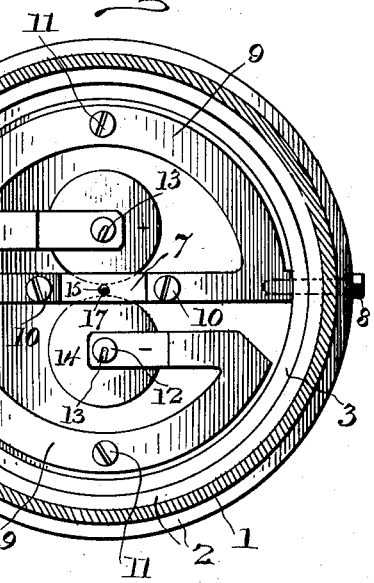
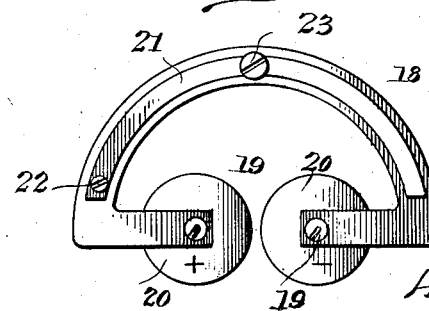
Witnesses
Fenton S Belt
Geo P Kingsbury
Inventor
Hans Liebreich
By Mason Fenwick & Lawrence
Attorneys

UNITED STATES PATENT OFFICE.

HANS LIEBREICH, OF DETROIT, MICHIGAN.

TELEPHONE-RECEIVER.

SPECIFICATION forming part of Letters Patent No. 687,999, dated December 3, 1901.

Application filed November 30, 1900. Serial No. 38,198. (No model.)

*To all whom it may concern:*

Be it known that I, HANS LIEBREICH, a citizen of the United States, residing at Detroit, in the county of Wayne and State of Michigan, have invented certain new and useful Improvements in Telephone-Receivers; and I do hereby declare the following to be a full, clear, and exact description of the invention, such as will enable others skilled in the art to which it appertains to make and use the same.

My invention relates to improvements in telephone-receivers; and it consists in a receiver having a suitable casing, diaphragms inclosed within the same, a magnet adapted to act upon the diaphragm, adjustable means for regulating the strength of the magnet, and means for connecting the instrument with a telephone-line whereby the diaphragm may be caused to vibrate in response to impulses received from the same.

It also consists in a telephone-receiver employing diaphragms, a magnet for operating upon the same, adjustable leaves or plates secured to the magnet whereby the strength of the same may be altered, and coils carried by the poles of the magnet and adapted to be connected with a telephone-line, whereby impulses received over the same may cause the vibration of the diaphragm for the reproduction of sounds or signals.

It also consists in certain other novel constructions, combinations, and arrangements of parts, as will be hereinafter more fully described and specifically claimed.

In the accompanying drawings, Figure 1 is a side elevation of my improved receiver. Fig. 2 is a longitudinal cross-section through the same. Fig. 3 is a transverse cross-section through the receiver to one side of the magnet, the magnet being shown in side elevation. Fig. 4 is a side elevation of a magnet made in a little different shape from that shown in Fig. 3.

The receiver forming the subject of the present invention is so made as to be capable of use in connection with ordinary telephone systems and is particularly well adapted for reproducing sounds or impulses received from a line employing a transformer for increasing the efficiency thereof.

The receiver is provided with a suitable casing made up of a series of rings, the outer rings 1 1, 2 2, and 3 inclosing the apparatus within the receiver. Suitable diaphragms of thin vibrant material, as 4 4, are secured in the rings 1 1 by means of clamping-rings 5 5. The rings 2 2 are intermediate ones connecting the rings 1 1 and the ring 3 and are provided with screw-threads upon their inner and outer surfaces for this purpose, which engage threads upon the outer surface of the ring 3 and upon the inner surface of the rings 1 1. By turning the rings 2 2 the distance between the rings 1 1 and the ring 3 can be varied and the distance between the diaphragm 4 4 can be regulated. The peripheries of the rings 2 2 are preferably provided with serrated portions, so that the said rings may be more easily turned when grasped by the hand. Cap-pieces 6 6, of ordinary construction, are preferably applied outside the diaphragms 4 4 and are formed with the usual perforations for the emission of sound-waves from the receiver.

Within the ring 3 and secured thereto is a suitable magnet, as 7, which may be made in various forms. A good form in which to make the said magnet is illustrated in Fig. 3 of the drawings, in which it is given an approximately S shape, the pole ends being bent inwardly so as to come opposite the central axis of the receiver. The said magnet is preferably secured to the ring 3 by means of screws or bolts 8 8, which may be adjusted from the outside of the receiver. In order to vary the strength of the magnet 7, I secure to each side thereof segmental plates 9 9, which are preferably secured at one end, as at 10, to the magnet, while the other end of each segment is free, I contemplate employing set-screws, as 11 11, which engage screw-threaded apertures in the plates 9 9 and bear at their inner ends upon the magnet 7 for adjusting the said plates to different distances from the magnet 7. By this structure I find that the strength of the magnet may be regulated as desired, it merely being necessary to spring the plates out to the proper distance from the magnet by means of the set-screws 11 to produce the said variation. The magnet is strengthened by permitting the plates to lie close to the magnet and is weakened by springing the plates away from the magnet.

The poles of the magnet, which are turned inwardly, are provided with pole-pieces 12 12, which are preferably screwed into the ends of the magnet upon each side thereof. These pole-pieces are slotted or kerfed, as at 13 13, to make it possible to demagnetize and magnetize them more quickly. The pole-pieces are surrounded by coils of wire, as 14 14, which are connected with each other by suitable wires and are adapted to be connected up with the line-wire of the telephone, so that impulses received over the same will vary the magnetic power of the pole-pieces. The pole-pieces are arranged so that their ends are in close proximity to the inner surfaces of the diaphragms 4 4 and so that the said diaphragms are acted upon at more than one point. By this construction when waves or impulses are received over the line-wire the diaphragms will be vibrated in a series of waves for the better reproducing of sounds or signals.

I find in practice that it is preferable to cause the diaphragms 4 4 to act in unison, and for this purpose I connect the two by means of a piece of catgut or other suitable string or cord 15. In order to secure the catgut to the diaphragms, I perforate the same, providing the said perforations with screw-threads, which are adapted to receive an adjusting nut or nipple, as 16. The ends of the catgut are passed through the nipples 16 16 and knotted outside the same. By turning the nipples 16 the tension of the catgut may be regulated. The catgut preferably passes through an aperture 17, formed in the magnet 7, so that its action upon the diaphragms is not interfered with by any of the mechanism within the receiver. By thus connecting the diaphragms, which are polarized, both of them are forced to vibrate simultaneously to the same extent, and their effect is collective and practically doubled, so that the power of the receiver is materially improved by this construction.

Instead of making the magnet in an S shape, as seen in Fig. 3, it may be made simply in the form of a horseshoe-magnet, as illustrated at 18 in Fig. 4. In this instance the ends of the magnet are turned inwardly in the same manner as before and carry pole-pieces 19 19, which are surrounded by coils 20 20. These coils are connected with the line-wire, as heretofore described with respect to the coils 14. Segmental plates 21 21 are secured to each side of the horseshoe-magnet 18 by screws 22, while set-screws 23 23 are employed for regulating the distance of the plates from the magnet proper, and thereby varying its power. It will be apparent that other minor details of construction may be varied without departing in the least from the spirit of the invention.

Having now described my invention, what I claim, and desire to secure by Letters Patent, is—

1. A receiver for telephones comprising diaphragms suitably supported in position, a magnet interposed between the same and acting upon both of them, and adjustable means secured to the magnet for varying the strength of the same, substantially as described.

2. A receiver for telephones comprising a casing, diaphragms mounted therein, a magnet arranged to act upon the diaphragms, means for varying the strength of the magnet comprising segmental adjustable plates mounted on each side of the magnet, means for adjusting the said plates at different distances from the said magnet, substantially as described.

3. In a telephone-receiver, the combination with vibrating diaphragms, of a magnet for acting upon the same, plates or leaves secured at one of their ends to the magnet, while the other ends are free, and set-screws carried by the said leaves adapted to bear upon the sides of the magnet for varying the distance of the plates from the magnet to alter its strength, substantially as described.

4. In a telephone-receiver, the combination with a casing, of diaphragms mounted therein, a magnet interposed between the diaphragm pole-pieces carried by the said magnet, coils surrounding the pole-pieces and connected with the telephone-line, and adjustable plates adjustably secured to each side of the magnet so that they may be held at greater or less distances therefrom for varying its strength, substantially as described.

5. A telephone-receiver comprising a casing made up of a series of rings, two of said rings being arranged between the other rings and engaging screw-threads upon the same, whereby upon turning the said rings the relative positions of all the rings may be modified, diaphragms mounted in the outer rings, a magnet mounted in the inner ring, and means for varying the strength of the magnet, substantially as described.

6. A telephone-receiver comprising a casing, diaphragms mounted therein in planes parallel to each other, means for connecting the said diaphragms so that they will vibrate in unison, a horseshoe-magnet mounted between the diaphragms having its free ends bent inwardly toward the center of the receiver, pole-pieces carried by the magnet and extending each way therefrom so as to act upon both of the diaphragms and coils surrounding the pole-pieces and connected with the line-wire for actuating the diaphragms, substantially as described.

7. A telephone-receiver comprising a casing, diaphragms therein mounted opposite to each other, adjustable means connecting the diaphragms comprising a cord passed through apertures in the diaphragm, adjusting-nipples engaging the said apertures and secured to the cord, whereby the tension thereof may be varied, and a magnet interposed between the diaphragms and provided with pole-pieces for attracting both of them, coils surrounding said pole-pieces and connected with a telephone-line for producing vibrations upon the diaphragms, substantially as described.

8. A telephone-receiver comprising a casing, diaphragms mounted therein, an S-shaped magnet mounted between the diaphragms, set-screws for holding the magnet in position in the casing and means for varying the strength of the magnet comprising plates or leaves adapted to be adjusted to different distances from the sides of the magnet to vary its strength, substantially as described.

In testimony whereof I hereunto affix my signature in presence of two witnesses.

HANS LIEBREICH.

Witnesses:
JOHN L. FLETCHER,
CASSELL SEVERANCE.